United States Patent
Besson et al.

(10) Patent No.: US 8,752,520 B2
(45) Date of Patent: Jun. 17, 2014

(54) COMBUSTION CHAMBER FOR A SUPERCHARGED DIRECT-INJECTION COMBUSTION ENGINE

(75) Inventors: Magali Besson, Le Val Saint Germain (FR); Gerard Giacomello, Guigneville (FR); Fano Rampanarivo, Antony (FR)

(73) Assignee: Renault S.A.S., Boulogne-Billancourt (FR)

( * ) Notice: Subject to any disclaimer, the term of this patent is extended or adjusted under 35 U.S.C. 154(b) by 469 days.

(21) Appl. No.: 12/809,277

(22) PCT Filed: Dec. 15, 2008

(86) PCT No.: PCT/EP2008/067520
§ 371 (c)(1),
(2), (4) Date: Nov. 15, 2010

(87) PCT Pub. No.: WO2009/077493
PCT Pub. Date: Jun. 25, 2009

(65) Prior Publication Data
US 2011/0048364 A1  Mar. 3, 2011

(30) Foreign Application Priority Data
Dec. 19, 2007  (FR) ...................................... 07 59986

(51) Int. Cl.
*F02F 3/00* (2006.01)
*F02B 23/06* (2006.01)
*F02B 3/06* (2006.01)

(52) U.S. Cl.
CPC ........... *F02B 23/0672* (2013.01); *Y02T 10/125* (2013.01); *F02B 3/06* (2013.01)

USPC ...................................... 123/193.1; 123/193.2

(58) Field of Classification Search
USPC .......... 123/193.1, 193.2, 193.3, 193.4, 193.5, 123/193.6, 47 R
See application file for complete search history.

(56) References Cited

U.S. PATENT DOCUMENTS

| 4,207,843 | A | * | 6/1980 | List et al. | ....................... 123/261 |
|---|---|---|---|---|---|
| 5,029,563 | A | * | 7/1991 | Hu | ................................ 123/262 |

(Continued)

FOREIGN PATENT DOCUMENTS

| CN | 2721886 | 8/2005 |
|---|---|---|
| FR | 2 818 325 | 6/2002 |
| FR | 2 881 182 | 7/2006 |

*Primary Examiner* — Noah Kamen
*Assistant Examiner* — Long T Tran
(74) *Attorney, Agent, or Firm* — Oblon, Spivak, McClelland, Maier & Neustadt, L.L.P.

(57) ABSTRACT

A piston for an internal combustion engine, for example a diesel engine, including a body delimited laterally by a skirt and configured to collaborate with walls of a cylinder of axis of revolution C in which the piston can slide along the axis C, the piston including a transverse face that includes a central pip, a peripheral ring, and a bowl of axis of revolution B that extends from the central pip towards the peripheral ring to which it connects at a lip of thickness Ep. The bowl includes, in substantial vertical alignment with the lip, a torus in profile, for example of a dome-shaped, of maximum radius Rt capable of guiding fuel injected under the lip in a region of a re-entrant zone R towards the central pip. The tip of the pip lying on the axis of revolution B of the bowl rises to a height that is a distance Dt of between 5.4 mm and 8 mm, or substantially equal to 7.2 mm, below the level of the peripheral ring.

17 Claims, 1 Drawing Sheet

(56) References Cited

U.S. PATENT DOCUMENTS

| | | | |
|---|---|---|---|
| 5,720,253 A * | 2/1998 | Matoba et al. | 123/298 |
| 6,161,518 A * | 12/2000 | Nakakita et al. | 123/298 |
| 6,637,402 B2 * | 10/2003 | Liu | 123/279 |
| 6,910,455 B2 * | 6/2005 | Sczepanski et al. | 123/193.6 |
| 6,935,301 B2 * | 8/2005 | Liu | 123/294 |
| 6,945,210 B2 * | 9/2005 | Liu | 123/193.4 |
| 6,955,165 B2 * | 10/2005 | Liu | 123/663 |
| 7,210,448 B2 * | 5/2007 | Stanton et al. | 123/298 |
| 7,318,406 B2 * | 1/2008 | Yi et al. | 123/276 |
| 7,370,627 B2 * | 5/2008 | Mahakul et al. | 123/276 |
| 7,438,039 B2 * | 10/2008 | Poola et al. | 123/193.6 |
| 7,458,358 B2 * | 12/2008 | Lineton et al. | 123/193.6 |
| 2003/0172896 A1 * | 9/2003 | Sczepanski et al. | 123/193.6 |
| 2006/0070603 A1 | 4/2006 | Stanton et al. | |
| 2008/0121204 A1 * | 5/2008 | Scharp | 123/193.6 |
| 2011/0048364 A1 | 3/2011 | Besson et al. | |
| 2011/0094470 A1 | 4/2011 | Augot et al. | |

* cited by examiner

COMBUSTION CHAMBER FOR A SUPERCHARGED DIRECT-INJECTION COMBUSTION ENGINE

BACKGROUND

The invention relates in general to the design of combustion engines, particularly compression-ignition internal combustion engines.

Emissions standards imposed on motor vehicle manufacturers are becoming increasingly severe, each change in a standard resulting in significant technical developments and in the use of additional and/or more complicated emissions-control devices which prove to be expensive.

Future standards are encouraging manufacturers especially to reduce the level of exhaust emissions of nitrogen oxides and particulates, notably in order not to clog the particulate filters too quickly, but the manufacturers are at the same time wishing to increase, or at least to maintain, the engine performance levels and drivability.

Solutions generally adopted to increase emissions control of engines for example consist in resorting to advanced post-treatment devices such as particulate filters or in modifying the exhaust gas recirculation specifications, the English acronym EGR being widely recognized in this field, although this has an adverse impact on engine efficiency.

BRIEF SUMMARY

It is an object of the present invention to propose a combustion chamber that is improved and that is able notably to reduce the level of nitrogen oxides and particulates exhaust emissions.

One subject of the invention is a piston for an internal combustion engine, notably for a diesel engine, comprising a body laterally delimited by a skirt able to collaborate with the walls of a cylinder of axis of revolution C in which the piston is able to slide along this axis C, said piston comprising a transverse face which comprises a central pip, a peripheral crown ring and a bowl of axis of revolution B which extends from the central pip toward the peripheral crown ring to which it is connected at a lip of thickness Ep, said bowl comprising, substantially in vertical alignment with the lip, a torus in profile, preferably half-dome shaped, of maximum radius Rt, able to guide a fuel injected under the lip in a reentrance zone R toward the central pip, notable in that the top of the pip situated on the axis of revolution B of the bowl rises up to a height that is a distance Dt of between 5.4 mm and 8 mm, and preferably substantially equal to 7.2 mm below the height of the peripheral crown ring.

Use of a piston according to the invention notably allows the following advantages to be realized:
  the post-treatment systems do not have to be made more complicated and more expensive;
  the nitrogen oxides emissions are reduced in order to comply with emissions control standards.

According to some particular embodiments, the piston has one or more of the following features:
  the central pip slopes toward the torus by an angle A, measured from the axis of revolution B of the bowl in the geometric direction, of between 65° and 65.7° and preferably substantially equal to 65°;
  the bowl is centered in the cylinder, the axis of revolution B of the bowl coinciding with the axis of revolution C of the cylinder;
  the thickness Ep of the lip is between 4 mm and 6 mm and preferably substantially equal to 5.3 mm;
  the maximum radius of curvature Rt of the torus is between 5 mm and 6 mm and preferably substantially equal to 5.2 mm;
  the lip is situated a distance De/2 from the axis of revolution B of the bowl, the distance De being between 49.6 mm and 51.5 mm and preferably substantially equal to 50 mm;
  the torus is situated a distance Db/2 from the axis of revolution B of the bowl, the distance Db being between 53.8 mm and 55.4 mm and preferably substantially equal to 54 mm;
  the difference in distances, with respect to the axis of revolution B of the bowl, of the end of the crown ring De/2 and of the end of the torus Db/2 is substantially equal to 2 mm;
  the maximum depth P of the bowl is between 14.8 mm and 16.2 mm and preferably substantially equal to 16.2 mm.

A further subject of the invention is an internal combustion engine designed for strict emissions control standards in terms of the emissions of nitrogen oxides and particulates and, more specifically, an engine of the diesel type comprising at least one piston according to the invention.

This internal combustion engine of the diesel type has a cylinder of axis of revolution C the upper end of which is closed by a cylinder head provided with an underside which contributes to defining a combustion chamber together with the transverse face of the piston the piston bowl of which is centered about an axis of revolution B that coincides with the axis C, said engine comprising, opening onto the underside of the cylinder head, at least one inlet duct that can be closed off by an inlet valve and at least one exhaust duct that can be closed off by an exhaust valve, a preheater plug and a fuel injector the tip of which opens into the combustion chamber substantially at the axis of revolution of the cylinder C.

BRIEF DESCRIPTION OF THE DRAWINGS

Other features and advantages of the invention will become clearly apparent from the description of the embodiment thereof given hereinafter by way of entirely nonlimiting indication with reference to the following figures.

DETAILED DESCRIPTION

Figure 1:
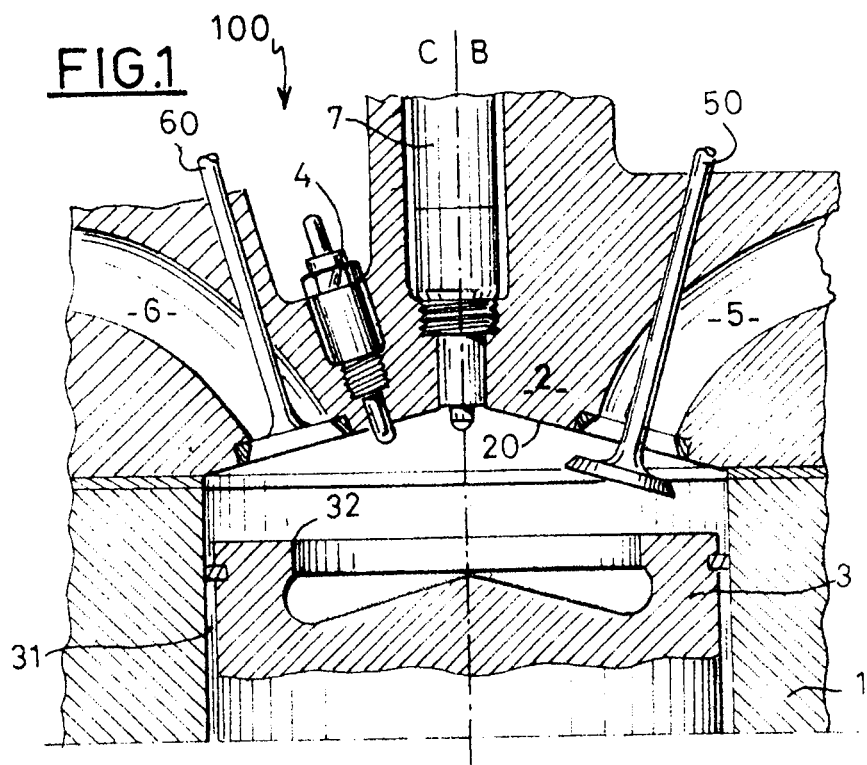
FIG. 1 is a partial schematic cross section of an internal combustion engine according to the invention.

FIG. 1 illustrates an internal combustion engine 100, notably for a diesel engine, comprising at least one cylinder 1 of axis of revolution C, a cylinder head 2 and a piston 3.

In the remainder of the description, this axis of revolution C will be considered to be oriented upward, toward the cylinder head 2.

The piston 3 is mounted in the cylinder 1 such that it can slide along the axis of revolution of the cylinder C, and has a piston body designed to accept a pin to connect the piston to the little end of a driving connecting rod, said body being laterally delimited by a piston skirt 31 running parallel to the axis of revolution of the cylinder C and collaborating with an internal wall of the cylinder 1. The piston further comprises a transverse face 32 which, together with the underside 20 of the cylinder head 2, contributes to delimiting a combustion chamber of the cylinder 1.

The fresh air or a mixture of fresh air and of recirculated exhaust gases is admitted to the combustion chamber via at least one inlet duct 5 formed in the cylinder head 2 and which can be closed off by at least one inlet valve 50.

The residue of combustion of the air-fuel mixture introduced is removed via at least one exhaust duct 6 formed in the cylinder head 2 and which can be closed off via at least one exhaust valve 60.

A preheater plug 4 is fitted in the cylinder head 2, its end opening into the combustion chamber so that it can heat the air-fuel mixture during cold starts.

A fuel injector 7 is fitted in the cylinder head 2 and opens into the combustion chamber substantially along the axis of revolution C of the cylinder 1.

Figure 2:
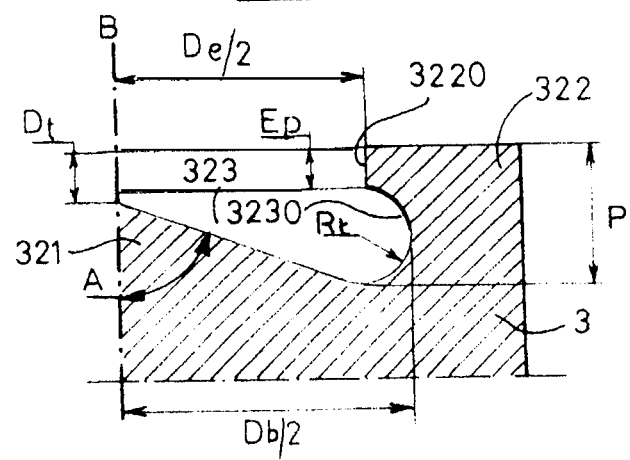
FIG. 2 is a partial cross section on a plane containing the axis of revolution of the piston bowl, showing the detail of the crown part of a piston according to the invention, on the inlet side.

As depicted in FIG. 2 which, in partial cross section on an axial plane, details the upper part of a piston 3 according to the invention, the transverse face 32 comprises a central pip 321, a peripheral crown ring 322 and an annular cavity or bowl 323 of axis of revolution B that coincides with the axis of revolution of the cylinder C, said bowl 323 extending from the central pip 321 toward the peripheral crown ring 322 to which it is connected.

As an alternative, the bowl 323 may be offset in the cylinder 1, the axes of revolution C of the cylinder 1 and B of the bowl 323 therefore being able to be offset from one another by a distance preferably shorter than a value substantially equal to 3 mm.

The peripheral crown ring 322 extends laterally from the skirt 31 of the piston 3 toward the axis of revolution B of the bowl 323 as far as an end that forms a lip 3220 underneath which the bowl 323 has a torus 3230 in profile half-dome shaped, with a maximum radius of curvature Rt of between 5 mm and 7 mm and preferably substantially equal to 6 mm.

The lip 3220 is situated a distance De/2 from the axis of revolution B of the bowl 323, the distance De being between 49.6 mm and 51.5 mm and preferably substantially equal to 50 mm.

The torus 3230 is situated a distance Db/2 from the axis of revolution B of the bowl 323, the distance Db being between 53.8 mm and 55.4 mm and preferably substantially equal to 54 mm.

The injector 7 is designed selectively to inject fuel in the form of jets directed into an upper region of the torus 3230 adjacent to a bottom edge of the lip 3220, also known as a reentrant edge R, so as to improve the way in which the jet of fuel is guided from this reentrant edge R by rolling along the walls of the torus 3230 toward the bottom of the bowl, where the oxygen is to be found as the piston 3 effects its upstroke, so as to reduce smoke and so as to enable the gases to be circulated toward the central pip 321.

For preference, a reentrant edge R will be maintained by keeping the difference in distances, with respect to the axis of revolution B of the bowl 323, of the end of the crown ring De/2 and of the end of the torus Db/2 substantially equal to 2 mm.

For preference, the thickness Ep of the lip 3220 corresponding to the distance of the reentrant edge R of the peripheral crown ring 322 is between 4 mm and 6 mm and preferably substantially equal to 5.3 mm.

The maximum depth P of the bowl 323 is between 14.8 mm and 16.2 mm and preferably substantially equal to 16.2 mm. The ratio Db/P gives the bowl 323 a substantial width which allows effective exploitation of the air under full load conditions, making it possible to achieve high specific performance, even with low swirl rates thus limiting the risk of the jets emitted by the injector 7 overlapping.

Combining this design of the reentrant edge R, with the torus 3230 and with a maximum bowl 323 depth P allows improved guidance of the jet of fuel toward a volume of air trapped in the bottom of the bowl 323.

The top of the central pip 321, situated on the axis of revolution B of the bowl, rises up to a height that is a distance Dt below the height of the peripheral crown ring, this distance Dt being between 5.4 mm and 8 mm, and preferably substantially equal to 7.2 mm. The distance Dt to the top of the peripheral crown ring makes it possible to limit interactions between the jets of fuel sprayed toward the bottom of the bowl with the central pip 321 and notably the top thereof, thus making it possible to reduce emissions of smoke and unburnt fuel.

The central pip 321 slopes by an angle A, measured from the axis of revolution B of the bowl in the geometric direction, of between 65° and 65.7° and preferably substantially equal to 65°.

Having the central pip 321 slope at an angle A like this allows the soot formed by combustion at the bottom of the bowl 323 to be extracted toward the central pip 321 for improved post-oxidation leading to a reduction in smoke.

An internal combustion engine 100 provided with a piston 3 combining these features proves to be particularly advantageous in use by comparison with an internal combustion engine provided with a piston suited to current emissions control standards, of the Euro 4 type. These tests were conducted using an engine 100 that had the following additional features: a bore of 85 mm, a compression ratio of about 15 and a level of swirl at bottom dead center Nd/N of about 3.

What was actually found was that under part-load conditions and for the same level of particulate emissions, this engine 100 emitted approximately 15% less nitrogen oxides.

For the same power and the same temperature before the turbine TAVT, at 4000 rpm and at full load, the amount of smoke was lower, and the smoke index was reduced by a value substantially equal to 0.5 fsn.

The invention claimed is:

1. A piston for an internal combustion engine, comprising:
a body laterally delimited by a skirt configured to collaborate with walls of a cylinder of axis of revolution (C) in which the piston can slide along the axis (C), the piston comprising a transverse face that comprises a central pip, a peripheral crown ring extending laterally from the skirt, and a bowl of axis of revolution (B) that extends from the central pip toward the peripheral crown ring to which it is connected at a lip of the peripheral crown ring, the bowl comprising, substantially in vertical alignment with the lip, a torus in profile, or of half-dome shaped, configured to guide a fuel injected under the lip in a re-entrance zone (R) toward the central pip,
wherein the top of the pip situated on the axis of revolution (B) of the bowl rises up to a height that is a distance (Dt) of between 5.4 mm and 8 mm below the height of a top of the peripheral crown ring, and
wherein the lip is situated a distance (De)/2 from the axis of revolution (B) of the bowl, wherein the torus is situated a distance (Db)/2 from the axis of revolution (B) of the bowl, and the distance (Db)/2 of the torus from the axis of revolution (B) of the bowl is greater by substantially 2 mm than the distance (De)/2 of the lip from the axis of revolution (B) of the bowl whereby the lip overhangs the torus, and
wherein the maximum depth (P) of the bowl is between 14.8 mm and 16.2 mm.

2. The piston as claimed in claim 1, wherein the bowl is centered in the cylinder, the axis of revolution (B) of the bowl coinciding with the axis of revolution (C) of the cylinder.

3. An internal combustion engine of diesel type, comprising at least one piston as claimed in claim 2.

4. The piston as claimed in claim 1, wherein a thickness (Ep) of the lip is between 4 mm and 6 mm.

5. The piston as claimed in claim 4, wherein the thickness (Ep) of the lip is substantially equal to 5.3 mm.

6. The piston as claimed in claim 1, wherein a maximum radius of curvature (Rt) of the torus is between 5 mm and 7 mm.

7. The piston as claimed in claim 6, wherein the maximum radius of curvature (Rt) of the torus is substantially equal to 6 mm.

8. The piston as claimed in claim 1, wherein the distance (De) is between 49.6 mm and 51.5 mm.

9. The piston as claimed in claim 8, wherein the distance (De) is substantially equal to 50 mm.

10. The piston as claimed in claim 1, wherein the distance (Db) is between 53.8 mm and 55.4 mm.

11. The piston as claimed in claim 10, wherein the distance (Db) is substantially equal to 54 mm.

12. The piston as claimed in claim 1, wherein the distance (Dt) is substantially equal to 7.2 mm.

13. The piston as claimed in claim 1 wherein the maximum depth (P) of the bowl is substantially equal to 16.2 mm.

14. The piston as claimed in claim 1, wherein a face of the central pip extends in a straight line from the top of the pip to the torus such that an angle (A) is formed between the face of the central pip and the axis of revolution (B).

15. The piston as claimed in claim 14, wherein the angle (A) is between 65° and 65.7°.

16. The piston as claimed in claim 15, wherein the angle (A) is substantially equal to 65°.

17. The piston as claimed in claim 14, wherein the angle (A) is to 65°.

* * * * *